United States Patent
Ito et al.

(10) Patent No.: US 7,570,400 B2
(45) Date of Patent: Aug. 4, 2009

(54) DOCUMENT READING DEVICE

(75) Inventors: Tetsushi Ito, Nara (JP); Shinichiroh Hiraoka, Yamatokoriyama (JP); Hisashi Yamanaka, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 844 days.

(21) Appl. No.: 11/269,494

(22) Filed: Nov. 8, 2005

(65) Prior Publication Data

US 2006/0098250 A1    May 11, 2006

(30) Foreign Application Priority Data

Nov. 11, 2004    (JP)    ............................. 2004-328039

(51) Int. Cl.
  *H04N 1/04* (2006.01)
  *G03G 15/00* (2006.01)
  *G03B 27/62* (2006.01)

(52) U.S. Cl. .................. 358/498; 358/496; 399/367; 399/379; 399/380; 355/75

(58) Field of Classification Search .......... 358/474, 358/498, 488, 491, 496, 497, 494, 486; 399/361, 399/367, 377, 379, 369, 365, 380; 355/75
See application file for complete search history.

(56) References Cited

U.S. PATENT DOCUMENTS

| | | | |
|---|---|---|---|
| 5,878,319 A * | 3/1999 | Itoh | 399/367 |
| 6,145,834 A * | 11/2000 | Hirota et al. | 271/225 |
| 6,585,258 B1 * | 7/2003 | Hirota et al. | 271/186 |
| 6,619,649 B2 * | 9/2003 | Takamatsu | 271/3.14 |
| 6,640,082 B2 * | 10/2003 | Mitomi | 399/374 |
| 6,640,083 B2 * | 10/2003 | Conard-White et al. | 399/377 |
| 6,697,600 B2 * | 2/2004 | Nishikino et al. | 399/380 |
| 6,930,805 B2 * | 8/2005 | Araki et al. | 358/496 |
| 7,050,206 B2 * | 5/2006 | Payne et al. | 358/488 |
| 7,202,983 B2 * | 4/2007 | Yokota et al. | 358/496 |
| 7,212,317 B2 * | 5/2007 | Ogata | 358/474 |
| 7,379,700 B2 * | 5/2008 | Iwata | 399/367 |
| 2006/0082842 A1 * | 4/2006 | Hiraoka et al. | 358/498 |

FOREIGN PATENT DOCUMENTS

| | | |
|---|---|---|
| JP | 11-005659 | 1/1999 |
| JP | 2002-278174 | 9/2002 |
| JP | 2003-261242 | 9/2003 |
| JP | 2004-021007 | 1/2004 |

\* cited by examiner

*Primary Examiner*—Twyler L Haskins
*Assistant Examiner*—Jonathan R Beckley
(74) *Attorney, Agent, or Firm*—Renner, Otto, Boisselle & Sklar, LLP

(57) ABSTRACT

A document reading device includes a movable member and a flexible document holder. The document holder is fixed at a first end to a free end of the movable member. The document holder is also fixed at a second end to the vicinity of a right-side end of a bottom surface of the document reading device. A portion of the document holder positioned immediately below a pivot axis of the movable member is not fixed to the bottom surface. When the movable member is pivoted to expose a portion of a document transport path, the document holder, except for the first and second ends as fixed to the bottom surface, hangs down without being folded.

4 Claims, 5 Drawing Sheets

DOCUMENT READING DEVICE

CROSS REFERENCE

This Nonprovisional application claims priority under 35 U.S.C. § 119(a) on Patent Application No. 2004-328039 filed in Japan on Nov. 11, 2004, the entire contents of which are hereby incorporated by reference.

BACKGROUND OF THE INVENTION

The invention relates to document reading devices in which an original document stacked on a document tray is transported on a document transport path to an output tray through a document reading area.

Document reading devices commonly used in image forming apparatuses automatically feed a plurality of original document sheets whose images are to be read consecutively, from a document tray to a document reading area. In such document reading devices, an original document to be fed to the document reading area is transported on a document transport path that is formed so as to lead from the document tray to a document platen.

Some of such document reading devices are provided with a document transport path that has an approximately C-shaped curve. The curve allows an original document to be fed to the document platen in an approximately horizontal position. Also, the curve contributes to downsizing of a document transport device. In the case, the document transport path has an upper portion, a curved portion, and a lower portion. Thus, it is impossible to remove an original document jammed in the lower portion even when a top cover of the document transport device is opened.

To deal with the foregoing problem, JP H11-5659 A discloses that a document holder, which holds an original document placed on the document platen so that the document will not move, is pivoted around a pivot axis that is oriented parallel to a document transport direction, to expose a portion of a document transport path positioned immediately above the document holder.

However, the prior art document holder needs to be pivoted at a wide angle for proper removal of an original document jammed in the document transport path. A small pivot angle of the document holder makes it hard to reach an original document jammed at a rear side of the document reading device, thereby preventing proper removal of the jammed document.

In view of the foregoing problem, document reading devices have been proposed in which a portion of a bottom surface thereof positioned immediately below a lower portion of the document transport path serves as a movable member that is pivotable around a pivot axis oriented in a direction perpendicular to a document transport direction. The movable member is pivoted to expose the whole length, in the direction perpendicular to the document transport direction, of the lower portion of the document transport path.

On the bottom surface of the document reading device, however, a document holder for pressing an original document against the document platen is provided so as to extend over the whole length and breadth of the document platen. The document holder is a white, flexible sheet that is positioned outwardly with respect to the movable member.

If the document holder is entirely fixed to the bottom surface, a portion of the document holder positioned immediately below the pivot axis of the movable member is folded when the movable member is pivoted. Repeated pivot movements of the movable member cause the portion to have such a fold as to prevent the portion from pressing an original document flat against the document platen. Thus, there is a space left between the document holder and the document platen or between the holder and the original document. The space allows a leak of light irradiated on the document for scanning an image thereof. The leak results in undesirable image noise on image data read from the document. Also, a portion of the document is prevented from being pressed flat against the document platen. Accordingly, image data cannot be precisely read from the document.

A feature of the invention is to provide a document reading device capable of reading an image of an original document precisely. The document reading device has a movable member that is pivoted to expose a portion of a document transport path and a document holder that is positioned outwardly with respect to the movable member. The document holder is configured so as not to have a fold even after repeated pivot movements of the movable member. The configuration prevents undesirable image noise from appearing on image data read from an original document. Also, the configuration allows an original document to be pressed flat against the document platen.

SUMMARY OF THE INVENTION

A document reading device of the invention includes a movable member and a document holder. The movable member is supported pivotably around a pivot axis that is oriented perpendicular to a document transport direction on a document transport path. The movable member is pivotable from a position to cover a portion of the document transport path to a position to expose the portion toward a document platen. The document holder includes a flexible sheet and is positioned so as to extend over the whole length and breadth of the document platen. The document holder is fixed at portions other than a portion positioned immediately below the pivot axis, to a bottom surface of the document reading device.

DETAILED DESCRIPTION OF THE INVENTION

With reference to the accompanying drawings, the document reading device according to preferred embodiments of the invention will be described in detail below.

Figure 1:
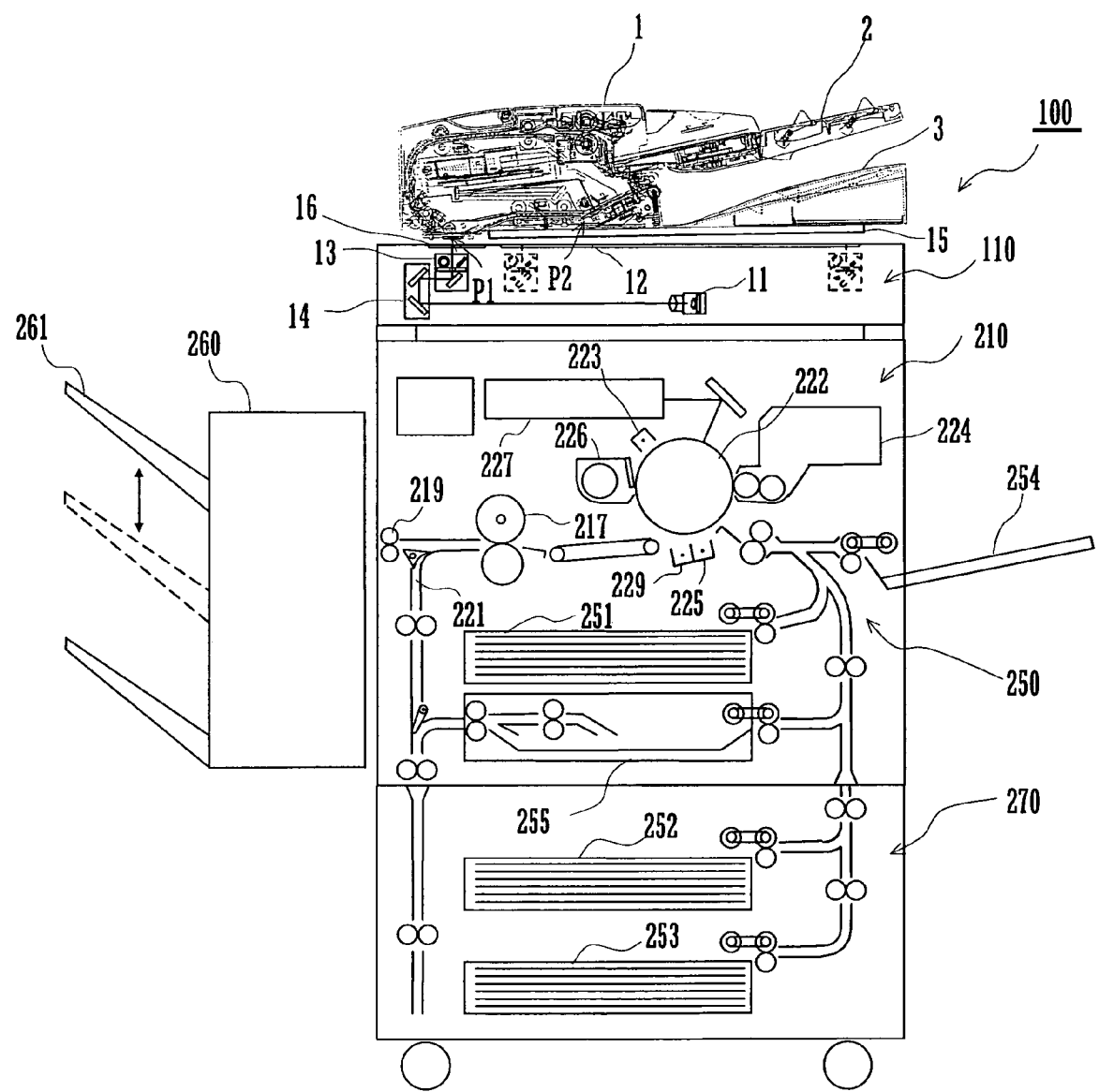
FIG. 1 is a diagram illustrating a schematic configuration of an image forming apparatus provided with a document reading device according to a first embodiment of the invention.

FIG. 1 is a diagram illustrating a schematic configuration of an image forming apparatus 100 provided with a document reading device 1 according to a first embodiment of the invention. The image forming apparatus 100 includes an image reading section 110, an image forming section 210, and a sheet feeding section 250. The image forming apparatus is also provided with a finishing device 260 and a multiple-tiered sheet feeding unit 270.

The image forming section 210 has a photoreceptor drum 222, a charging device 223, a laser writing unit 227, a developing device 224, a transferring device 225, a separating device 229, and a cleaning device 226. The charging device 223 charges a circumferential surface of the photoreceptor drum 222 so that the circumferential surface has a predetermined electrical potential. The laser writing unit 227 irradiates the circumferential surface of the photoreceptor drum 222 with laser light modulated according to image data, thereby forming an electrostatic latent image on the circumferential surface. The developing device 224 develops the latent image into a toner image by applying toner to the electrostatic latent image. The transferring device 225 transfers the toner image formed on the circumferential surface of the photoreceptor drum 222 onto a sheet. The separating device 229 separates a sheet from the circumferential surface of the photoreceptor drum 222. The cleaning device 226 removes and collects residual toner from the circumferential surface of the photoreceptor drum 222.

The document reading device 1 is movably provided above the image reading section 110. The document reading device 1 is moved to expose respective upper surfaces of a first document platen 12 and a second document platen 16. The image reading section 110 reads image data from an original document and transmits the image data to the image forming section 210. The image data undergoes a predetermined image processing in an image processing section provided in the image forming section 210. Then, the image data is temporarily stored in a memory of the image forming section 210. Upon receipt of an output command, the image data is read out from the memory and transferred to the laser writing unit 227.

It is to be noted that an optical writing head unit using an array of light-emitting elements such as LED or EL is substitutable for the laser writing unit 227.

The sheet feeding section 250 is located below the image forming section 210. The sheet feeding section 250 includes a sheet feeding tray 251, a manual sheet feeding tray 254, a duplex-printing unit 255, and the multiple-tiered sheet feeding unit 270. The unit 270 has sheet feeding trays 252 and 253. In the sheet feeding section 250, a sheet transport path is provided for transporting a sheet stored in any of the trays 251 to 254 via between the photoreceptor drum 222 and the transferring device 225.

The duplex-printing unit 255 is used for printing on both sides of a sheet. The duplex-printing unit 255 is connected to a switchback path 221. The switchback path 221 is provided for reversing leading and trailing edges of a sheet. The duplex-printing unit 255 is interchangeable with a normal sheet feeding tray or a large-capacity sheet feeding unit capable of storing several thousand sheets.

Provided at an output side of the image forming section 210 are a fusing unit 217, the switchback path 221, a finishing device 260, and sheet output rollers 219. The fusing unit 217 heats and presses a sheet that bears a transferred toner image, so that the toner image is fixed to the sheet. The switchback path 221 reverses leading and trailing edges of a sheet so that an image is formed on a reverse side of the sheet. The finishing device 260, which has an elevating tray 261, performs a finishing process such as stapling, to a sheet with an image formed thereon. After a toner image is fixed thereto in the fusing unit 217, a sheet is led to the switchback path 221, as necessary. Then, the sheet is guided, by the sheet output rollers 219, into the finishing device 260 where the sheet undergoes predetermined finishing processes. Finally, the sheet is output onto the elevating tray 261.

The image reading section 110 has a charge coupled device (CCD) scanning unit 11, a light source unit 13, and a mirror unit 14. The CCD scanning unit 11 is fixed at a predetermined position. An original document is placed and held flat on the first document platen 12. The light source unit 13 and the mirror unit 14 are used to produce an image of the original document on the CCD scanning unit 11. An image reading process is thus performed. The CCD scanning unit 11 has an imaging lens and a CCD image sensor.

The light source unit 13 has a light source, a reflector, a slit, and a mirror. The light source irradiates illuminating light. The reflector focuses the illuminating light on a predetermined image reading area on the first document platen 12. The slit allows only reflected light from an original document to pass therethrough. The mirror deflects the reflected light that passes through the slit, at an angle of 90 degrees. The mirror unit 14 has a pair of mirrors for deflecting the reflected light at an angle of 180 degrees.

In stationary reading mode, the light source unit 13 and the mirror unit 14 are reciprocated under the first document platen 12 along a slow scanning direction at velocities V and V/2, respectively. Thus, reflection of light irradiated over the whole length and breadth of an image-bearing side of an original document is collected in the CCD scanning unit 11, with light path length maintained constant.

The configuration of the image reading section 110 includes, but is not limited to, the foregoing one. In an alternative configuration, the image reading section 110 has, as a substitute for the CCD scanning unit 11, an optical unit provided with a CCD image sensor, an imaging lens, and a light source. In the stationary reading mode, the optical unit is reciprocated under the first document platen 12 along the slow scanning direction at velocity V.

The image reading section 110 has the second document platen 16 positioned at a predetermined distance in the slow scanning direction from the first document platen 12. In transport reading mode in which the document reading device 1 is used, the light source unit 13 is held still so as to face a first image reading area P1 across the second document platen 16.

Figure 2:
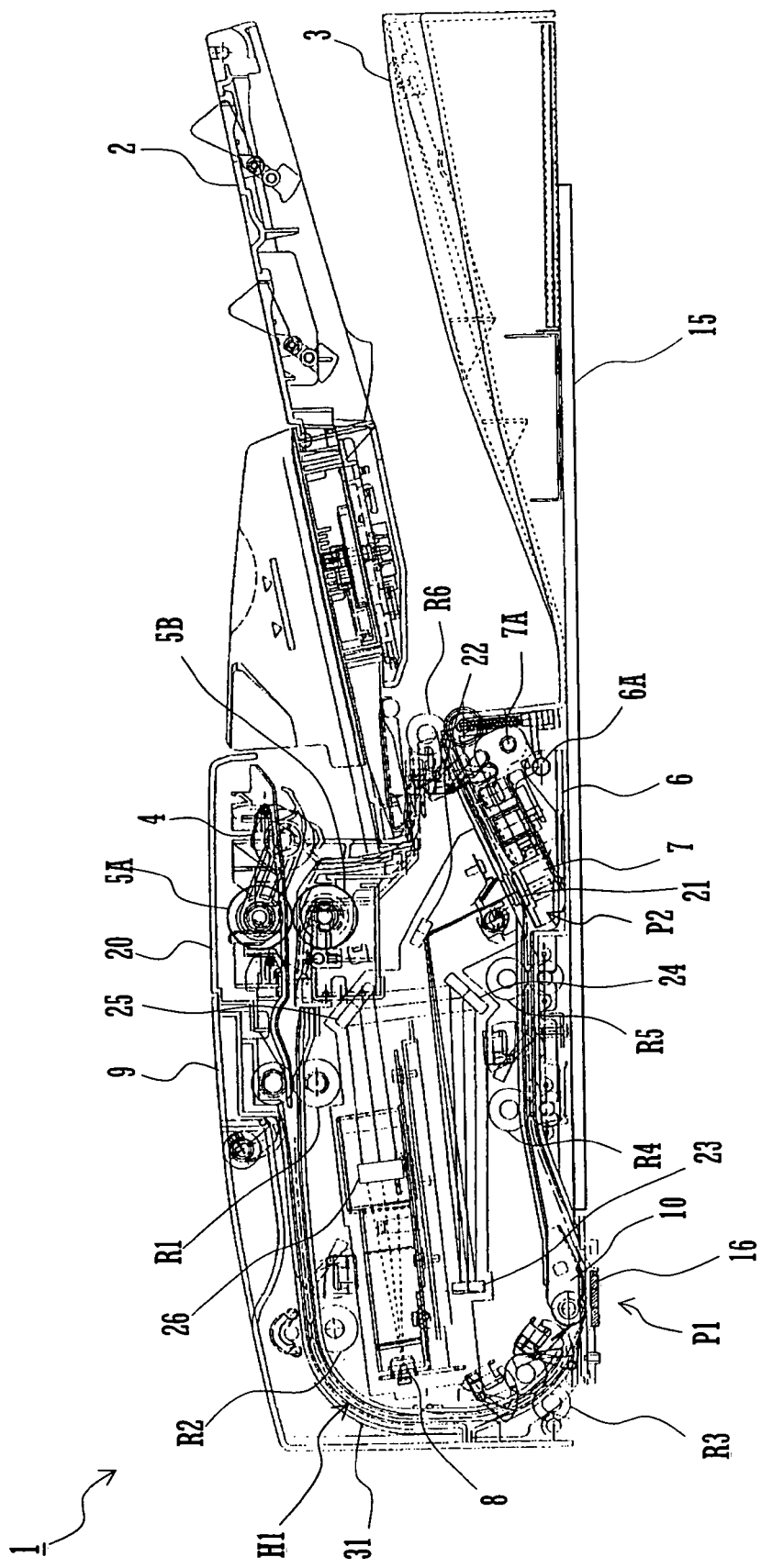
FIG. 2 is a cross-sectional view illustrating a configuration of the document reading device.

FIG. 2 is a cross-sectional view illustrating a configuration of the document reading device 1. The document reading device 1 has a document tray 2 and a document output tray 3. An original document is stacked on the document tray 2. After an image thereof is read, an original document is output onto the document output tray 3. A document transport path H1 is formed approximately in the shape of the letter C, so as to lead from the document tray 2, through the first image reading area P1 and a second image reading area P2, to the document output tray 3. Arranged along the document transport path H1 are a pick-up roller 4, a feeding roller 5A, a separating roller 5B, and rollers R1 to R6.

The rollers R1, R2, R4, and R5 are transport rollers for transporting an original document on the document transport path H1 at a predetermined speed. The rollers R3 are registration rollers that are driven in synchronization with an image reading process performed in either of the image reading areas P1 and P2. An original document fed from the document tray 2 is held, for skew correction, by the leading end thereof by the registration rollers R3 that are in undriven state. Then, the registration rollers 3 are driven to transport the document to the image reading areas P1 and P2 at a predetermined timing. The roller R6 is an output roller for outputting an original document whose image is read, to the document output tray 3.

On the document transport path H1, a platen 10 is provided in the first image reading area P1 with a predetermined distance from the second document platen 16. The CCD scanning unit 11 reads an image of a first side of an original document while the document is being transported through the first image reading area P1 that is located between the second document platen 16 and the platen 10.

A glass platen 21 is provided at an upper side of the second image reading area P2. The second image reading area P2 corresponds to the image reading area of the invention. The area P2 is located downstream of the first image reading area P1 in a document transport direction. Inside the document reading device 1, a CCD 8, mirrors 22 to 25, and a lens 26 are arranged in a space surrounded by the document transport path H1. Light reflected from the second image reading area P2 is brought to the CCD 8 through the glass platen 21, the lens 26, and the mirrors 22 to 25. The CCD 8 reads an image of a second side of an original document while the document is being transported through the second image reading area P2.

Described below is an image reading process performed in simplex image reading mode in which an image of a single side of an original document is read. The pick-up roller 4 is rotated to pick up a top sheet of an original document stacked on the document tray 2. The feeding roller 5A is rotated to feed the sheet into the document transport path H1. The separating roller 5B is rotated in the same direction as a direction in which the feeding roller 5A is rotated. If the top sheet is picked up together with lower sheets, the lower sheets are separated from the top sheet and returned to the document tray 2 by the separating roller 5B. Thus, only the top sheet is fed into the document transport path H1.

The sheet is transported on the path H1 by the transport rollers R1 and R2 being rotated. The sheet is transported to the first image reading area P1 at a predetermined timing by the registration rollers R3 being rotated. While passing through the area P1, an image of a first side of the sheet is read by the CCD scanning unit 11. After the image is read, the sheet is output to the document output tray 3 by the transport rollers R4 and R5 and the output roller R6 being respectively rotated.

Next described below is an image reading process performed in duplex image reading mode in which images of both sides of an original document is read. After an image of a first side thereof is read in the first image reading area P1, an original document sheet is transported to the second image reading area 2 by the transport rollers R4 and R5. While the sheet is being transported through the second image reading area P2, the CCD 8 reads an image of a second side of the sheet. Then, the sheet is output onto the document output tray 3 by the output roller R6 being rotated.

A face panel 20 is provided so as to cover the outside of the document transport path H1. The face panel 20 includes a cover 9 that covers upper and left-side portions of the document transport path H1. The cover 9 is hinged at a lower left-side end. The cover 9 is integrated with a transport guide 31. The transport guide 31, which is approximately L-shaped, is located along outer sides of the upper and left-side portions of the document transport path H1.

The face panel 20 has a portion that serves as a bottom surface of the document reading device 1, which is hereinafter referred to merely as the bottom surface. A first movable member 6 serves as a portion of the bottom surface that faces a lower portion of the document transport path H1. The first movable member 6 is supported pivotably around a pivot axis 6A, so as to open downwards, i.e., toward the first document platen 12. The pivot axis 6A is oriented perpendicular to the document transport direction. Inside the document reading device 1, a second movable member 7 is located inwardly with respect to the first movable member 6. The second movable member 7 is supported pivotably around a pivot axis 7A, so as to open downwards. The pivot axis 7A is oriented perpendicular to the document transport direction.

Provided on the bottom surface is a document holder 15 that extends at least over the whole length and breadth of the first document platen 12. The document holder 15 is a flexible sheet so elastic as to be easily deformed by an external force. The document holder 15 includes a white sheet and a cushioned mat. The white sheet comes in contact with an original document to be placed on the first original platen 12. The cushioned mat includes a foam material such as urethane foam. The document holder 15 presses the original document as placed, flat against the first original platen 12 from above.

Figure 3:
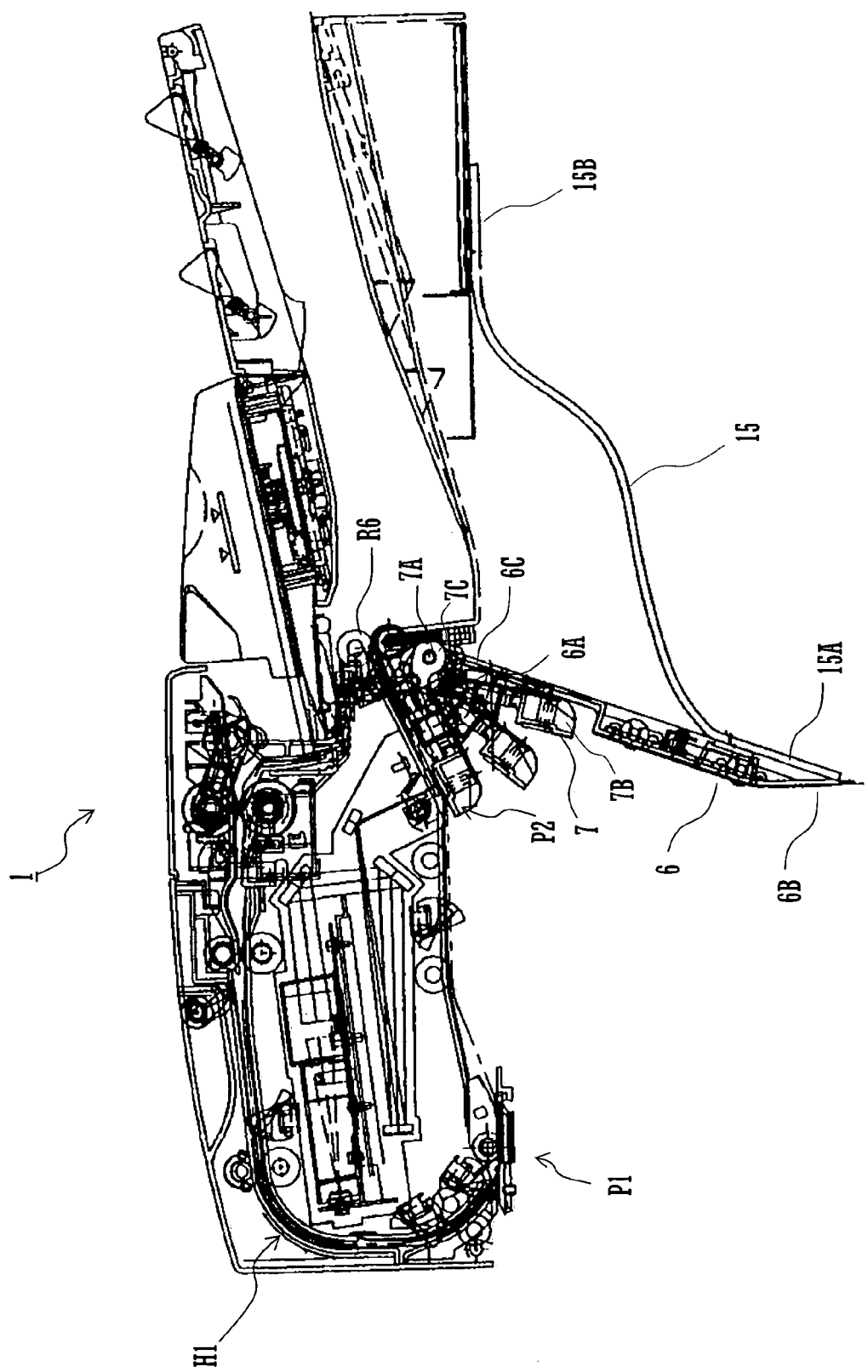
FIG. 3 is a cross-sectional view illustrating an open state of a movable member provided in the document reading device.

FIG. 3 is a cross-sectional view illustrating respective open states of the first movable member 6 and the second movable member 7 provided in the document reading device 1 according to the first embodiment of the invention. A free end 6B is moved toward the first document platen 12 (not shown), so that the first movable member 6 is pivoted around the pivot axis 6A that is provided at a pivotal end 6C. Simultaneously, a free end 7B is moved toward the first document platen 12, so that the second movable member 7 is pivoted around the pivot axis 7A that is provided at a pivotal end 7C. Thus, a portion of the document transport path H1 leading from the image reading area P1 through the image reading position P2 to the vicinity of the output roller R6, which is hereinafter referred to merely as the portion, is exposed to the outside at the bottom of the document reading device 1. The exposure facilitates removal of a jammed original document from the document transport path H1.

In the first embodiment, the document holder 15 is fixed at a first end 15A to a free end 6B of the first movable member 6. The document holder 15 is also fixed at a second end 15B to the vicinity of a right-side end of the bottom surface. A portion of the document holder 15 positioned immediately below the pivot axis 6A is not fixed to the bottom surface.

When the first movable member 6 is pivoted to expose the portion of the document transport path H1, the document holder 15 hangs down, except for the ends 15A and 15B as fixed to the bottom surface. Thus, the document holder 15 is not caused to have a fold at a portion thereof, particularly at the portion immediately below the pivot axis 6A, even after repeated pivot movements of the first movable member 6.

The foregoing configuration prevents a space allowing a leak of light irradiated on an original document placed on the first original platen 12 from being left between the document holder 15 and the platen 12 or between the holder 15 and the original document. Thus, the configuration prevents generation of image noise on image data. The foregoing configuration also allows an original document to be pressed flat against the platen 12, thereby allowing precise reading of image data.

Figure 4:
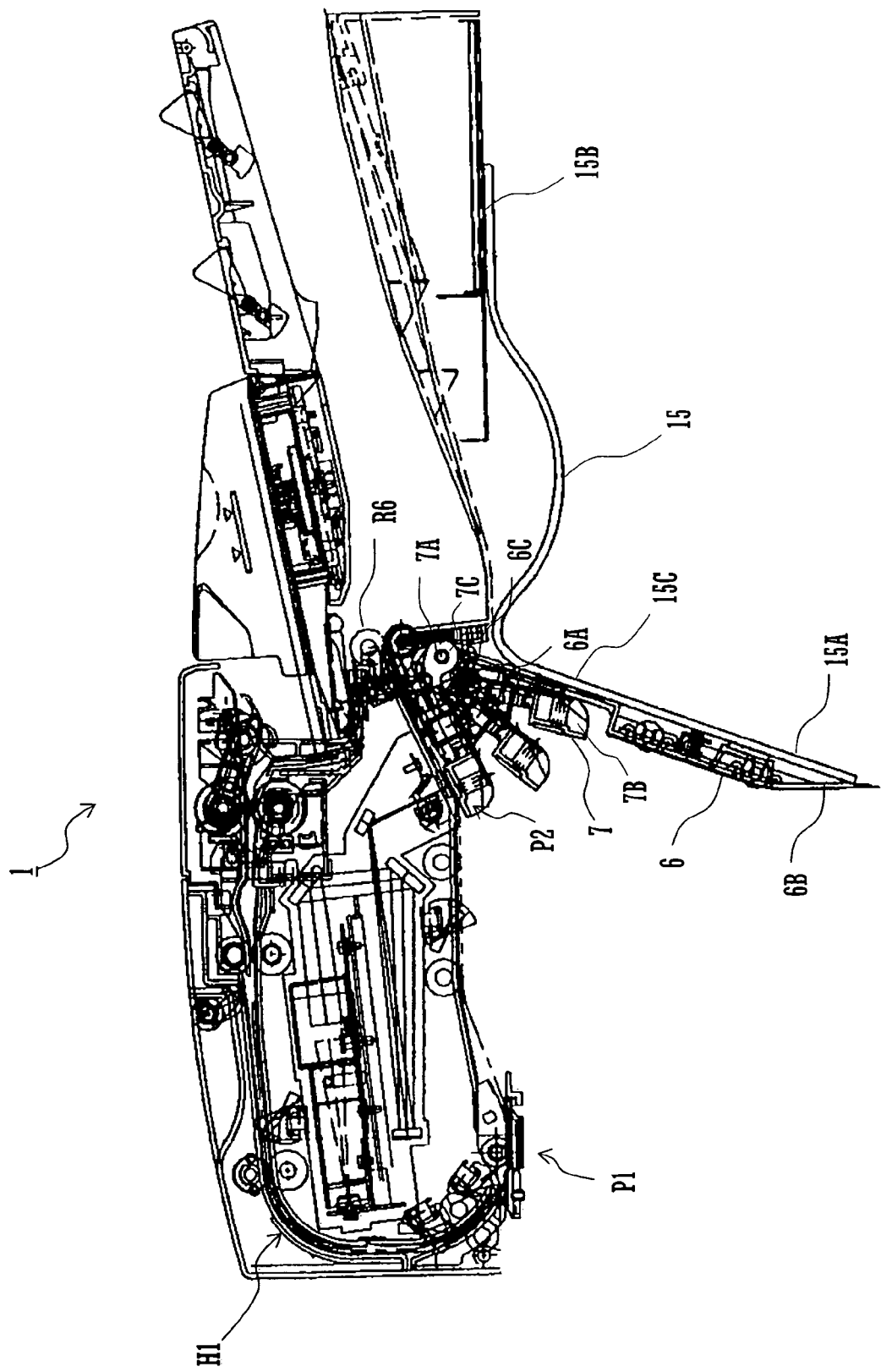
FIG. 4 is a cross-sectional view illustrating an open state of a movable member provided in the document reading device according to a second embodiment of the invention.

FIG. 4 is a cross-sectional view illustrating respective open states of the first movable member 6 and the second movable member 7 provided in the document reading device 1 according to a second embodiment of the invention. In the second embodiment, the document holder 15 is fixed at the first end 15A to the free end 6B. The document holder 15 is also fixed at an intermediate portion 15C to a portion of the bottom surface other than the free end 6B and the pivotal end 6C. The document holder 15 is further fixed at the second end 15B to the vicinity of the right-side end of the bottom surface. A portion of the document holder 15 positioned immediately below the pivot axis 6A is not fixed to the bottom surface.

When the first movable member 6 is pivoted to expose the portion of the document transport path H1, a comparatively small portion of the document holder 15 from the intermediate portion 15C to the second end 15B hangs down. Thus, the document holder 15 is not caused to have a fold at a portion thereof, particularly at the portion immediately below the pivot axis 6A, even after repeated pivot movements of the first movable member 6. Further, the foregoing configuration allows a comparatively small space to be formed between the bottom surface and the document holder 15 when the movable members 6 and 7 are pivoted. The space is sufficiently small to prevent foreign objects from getting thereinto.

Figure 5:
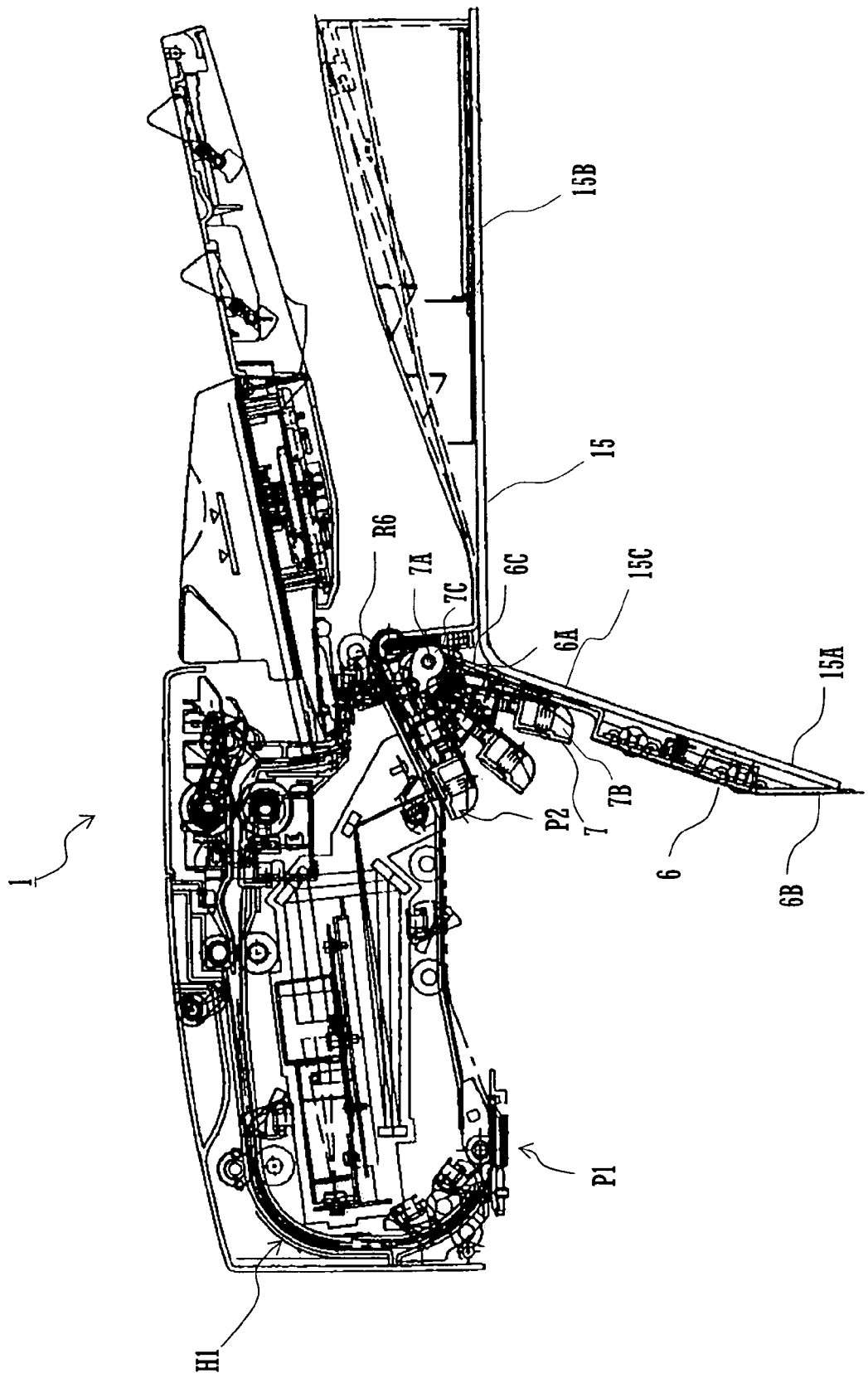
FIG. 5 is a cross-sectional view illustrating an open state of a movable member provided in the document reading device according to a third embodiment of the invention.

FIG. 5 is a cross-sectional view illustrating respective open states of the first movable member 6 and the second movable member 7 provided in the document reading device 1 according to a third embodiment of the invention. In the third embodiment, the document holder 15 is fixed at the first end 15A to the free end 6B. The document holder 15 is also fixed at the intermediate portion 15C to a portion of the bottom surface other than the free end 6B and the pivotal end 6C. The second end 15B is attached to the vicinity of the right-side end of the bottom surface, so as to be movable along a direction parallel to the bottom surface. A portion of the document holder 15 positioned immediately below the pivot axis 6A is not fixed to the bottom surface.

The second end 15B is attached to the vicinity of the right-side end of the bottom surface in a manner as described below, for example. A pin with a flange attached to a lower edge is projected downward from the bottom surface. A lengthwise slit is formed in an upper surface of the document holder 15 at the second end 15B. The flange is fitted into the slit.

When the first movable member 6 is pivoted to expose the portion of the document transport path H1, a portion of the document holder 15 from the intermediate portion 15C to the second end 15B is moved in the direction parallel to the bottom surface without hanging down. Thus, the document holder 15 is not caused to have a fold at a portion thereof, particularly at the portion immediately below the pivot axis 6A, even after repeated pivot movements of the first movable member 6. Further, the foregoing configuration allows little space to be formed between the bottom surface and the document holder 15 when the movable members 6 and 7 are pivoted. Accordingly, foreign objects are prevented from getting between the bottom surface and the document holder 15.

It is to be noted that the above-described configurations are illustrative examples. There are other possible configurations to meet the condition that at least a portion of the document holder 15 immediately below the pivot axis 6A is not fixed to the bottom surface.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A document reading device configured to read an image of an original document placed on a document platen, comprising:
    a document tray for an original document to be stacked thereon;
    an output tray for receiving the original document that is output after an image thereof is read;
    a document transport path on which the original document is transported, the original transport path leading from the document tray through an image reading area to the output tray;
    a movable member that serves as part of a bottom surface of the document reading device, the movable member being supported pivotably around a pivot axis that is perpendicular to a document transport direction on the document transport path, and the movable member having a free end and a pivotal end; and
    a document holder that includes a flexible sheet, the document holder being positioned so as to extend over the whole length and breadth of the document platen,
    wherein the movable member is pivotable from a position to cover a portion of the document transport path to a position to expose the portion toward the document platen, and
    wherein the document holder is fixed at portions other than a portion that is positioned immediately below the pivot axis, to the bottom surface of the document reading device.

2. The document reading device according to claim 1, wherein the document holder is fixed to the bottom surface of the document reading device at respective ends thereof in the document transport direction.

3. The document reading device according to claim 1, wherein the document holder has a first end that faces the free end, an intermediate portion that faces a portion of the movable member other than the free end and the pivotal end, and a second end, and
    wherein the document holder is fixed to the bottom surface of the document reading device at the first and second ends and at the intermediate portion.

4. The document reading device according to claim 1, wherein the document holder has a first end that faces the free end, an intermediate portion that faces a portion of the movable member other than the free end and the pivotal end, and a second end, and
    wherein the document holder is fixed to the bottom surface of the document reading device at the first end and at the intermediate portion, and the document holder is attached at the second end to the bottom surface so as to be movable along a direction parallel to the document transport direction.

* * * * *